(No Model.)
W. C. LOCKWOOD.
TELEPHONE.
No. 346,377. Patented July 27, 1886.
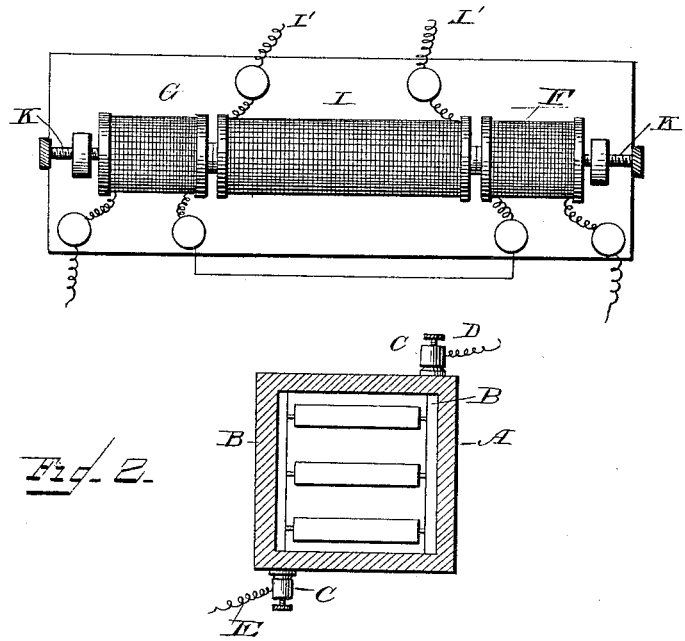
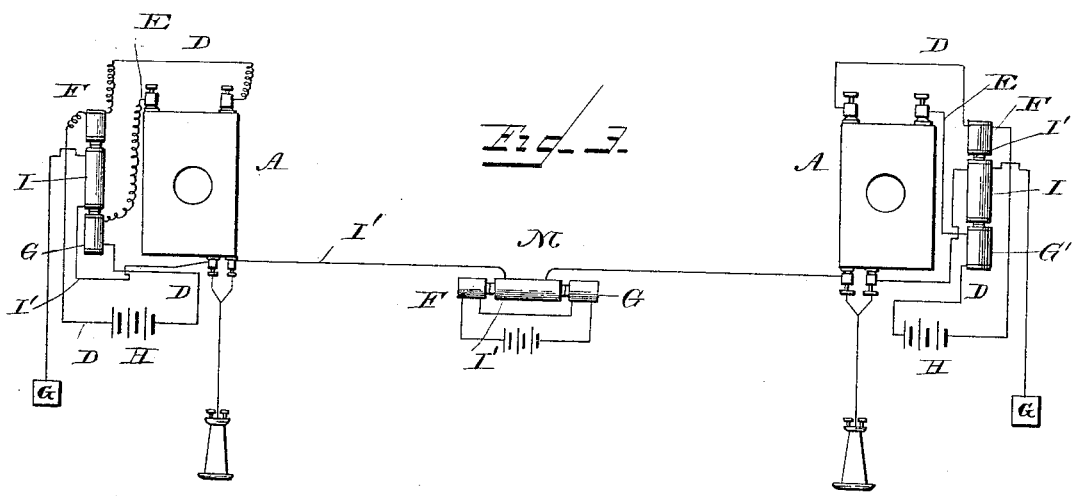
WITNESSES
F. L. Durand
Chas. L. Coombs
INVENTOR
Wm. C. Lockwood

UNITED STATES PATENT OFFICE.

WILLIAM C. LOCKWOOD, OF HOBOKEN, NEW JERSEY, ASSIGNOR OF ONE-HALF TO SILAS M. STILWELL, OF NEW YORK, N. Y.

TELEPHONE.

SPECIFICATION forming part of Letters Patent No. 346,377, dated July 27, 1886.

Application filed January 6, 1886. Serial No. 187,790. (No model.)

*To all whom it may concern:*

Be it known that I, WILLIAM C. LOCKWOOD, a citizen of the United States, residing at Hoboken, in the county of Hudson and State of New Jersey, have invented certain new and useful Improvements in Telephones; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in telephones and telephonic systems; and it has for its object to provide for passing a powerful current, which will overcome great resistance, through the main line of a telephonic system by the inductive magnetic action of the cores of a series of spools embraced in a local or battery and transmitter circuit upon the core of an independent spool embraced in the main or receiver circuit.

To this end the invention consists in providing a local circuit having the battery and transmitter in electrical circuit with two spools or helices properly arranged, and the line-wires leading to the receivers in circuit with a spool or helix located between the two spools or helices, the cores of the three spools, respectively, being separate, but arranged longitudinally in line with each other, as more fully hereinafter explained.

The above-mentioned objects I accomplish by any convenient arrangement of coils which will effect the conditions before named; but to fully illustrate my invention, reference is made to the accompanying drawings and figures and letters of reference thereof, forming part of this specification, in which—

Figure 1 represents a top view of the coils or helices of the local and main lines in their proper relative positions; Fig. 2, a view of a transmitter forming part of the local circuit, and Fig. 3 a diagram showing my invention arranged in connection with a complete telephonic system.

In the drawings, the letter A indicates the transmitter, which consists, preferably, of a casing of suitable shape, having two or more vibratory plates constructed of glass or other suitable material, and mounted between conductors B, which form a connection between the two binding-posts C and the wires D E of the local circuit of the system. The said wires connect with the coils of the spools F G and the battery H, constituting the local circuit. The coils or helices are wound around iron cores in such direction as to have the opposite poles opposite each other—that is to say, the north pole of one facing the south pole of the other, when the coils are subjected to the action of the current from the battery.

The letter I indicates the coil or helix which forms part of the main line or circuit. The said coil or helix is composed of insulated wire wound around a core of soft iron, which is located longitudinally in line with the cores of the spools or helices F G, but disconnected from the same, and the terminals of the wire forming the spool or helix I connect with suitable binding-post, from which proceed the line and ground wires of the main circuit, in which the receiving-instruments at each end of the line are embraced. The coils or helices F G, with their cores, may be adjustably mounted and controlled by set-screws K K, so that they may be adjusted longitudinally to and from the poles of the coil or helix I, in order to vary the strength of the current over the main line, according to the resistance offered by the same.

The letter M indicates a relay, which may be located in the main line. This consists of a series of spools or helices precisely like the spools or helices F G I. The spool I is located directly in the line, and the spools F G in the local or battery current of said relay. As constructed, it will be observed that the cores of the primary and secondary coils or helices are entirely independent of each other, so that the secondary coil receives its current entirely from the magnetic induction in the field between the cores of the two primary coils, between which the core of the secondary coil is located, and will be controlled by the vibrations in the diaphragms, and the consequent variations in the local circuit caused thereby.

Any approved electrical transmitter may be employed in connection with my improved system without departing from the spirit of my invention, the ordinary induction-coil usually employed in such cases, however, being omitted, and the local circuit connected directly with the primary coils above mentioned.

Having thus fully described my invention, what I claim, and desire to secure by Letters Patent, is—

1. A telephonic instrument composed of two spools or helices adapted to be placed in a local telephonic circuit and an intermediate spool or helix adapted to be placed in the main or line circuit, the spools having separate or independent cores, substantially as and for the purposes specified.

2. In a telephonic system, the combination, with the local circuit embracing a suitable transmitter and battery, of the spools or helices having separate and independent cores adapted to establish a current by magnetic induction in the main line leading to the receiver, substantially as specified.

3. The combination, with the local spools and their connections, of the intermediate spool and its connections, the cores of the respective spools being independent and separate from each other, and located longitudinally in line with each other, substantially as specified.

4. In combination with the main-line spool or helix, the local spools or helices having independent cores and adjustably mounted at each end of the main spool and the adjusting-screws, whereby the local spools may be adjusted to and from the main spool, substantially as set forth.

In testimony whereof I affix my signature in presence of two witnesses.

WM. C. LOCKWOOD.

Witnesses:
CHAS. L. COOMBS,
M. P. CALLAN.